Figure 1:
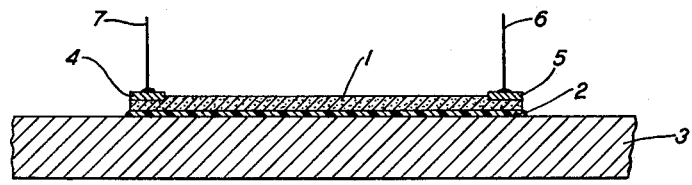

June 16, 1964     W. G. PFANN     3,137,834

PIEZORESISTIVE STRESS GAGES

Filed March 17, 1961

INVENTOR
W. G. PFANN
BY
*George S. Indig*
ATTORNEY

3,137,834
PIEZORESISTIVE STRESS GAGES
William G. Pfann, Far Hills, N.J., assignor to Bell Telephone Laboratories, Incorporated, New York, N.Y., a corporation of New York
Filed Mar. 17, 1961, Ser. No. 96,463
15 Claims. (Cl. 338—6)

This invention relates to novel approaches to the measurement of stress involving the use of critical relations between the transverse and longitudinal piezoresistive coefficients of semiconductor materials.

It has been the practice in the art of semiconductor piezoresistive stress or strain gage construction to seek wherever possible the largest piezoresistive coefficient obtainable in a given piezoresistive material thus obtaining the highest piezoresistive strain sensitivity. Piezoresistive materials characteristically provide this most advantageous coefficient in one particular crystallographic orientation of the crystal. Typically this most advantageous orientation utilizes the longitudinal piezoresistive coefficient of the material. Heretofore the transverse piezoresistive coefficient has been ignored primarily since its magnitude is generally substantially less than the longitudinal coefficient.

It has now been found that certain crystallographic orientations exist for particular materials which provide highly desirable critical relationships between the transverse and longitudinal coefficients. The utilization of such orientations provides new and unexpected functions in stress transducers.

The need has been recognized for a stress gage which records the sum of the principal stresses in a medium but which is independent of the orientation of the gage with respect to the directions of principal stresses in the medium. Using conventional gages great care must be taken to properly align the gage so that the piezoresistive effect in the gage is responsive to the principal directional stress. Where the stress direction is not known, as is often the case, multiple measurements in different alignments over the medium must be obtained to insure the proper reading. Using the principles of this invention as applied to stress measuring techniques, the sum of the principal stresses in a medium can be determined with a single measurement in a random direction. This random measurement is completely independent of the direction of the principal stress in the member.

The requirements of the crystal for a straight-form gage which records the sum of the principal biaxial stresses in the plane of the gage, regardless of their direction, are that the longitudinal and transverse piezoresistance coefficients, measured in the plane of the gage and designated $\pi'_{11}$ and $\pi'_{12}$ respectively, be equal, and the longitudinal shear coefficient, $\pi'_{16}$, be essentially zero. This requirement is met for an ideal (100) valley semiconductor of the diamond-cubic or zinc blende structure, if the longitudinal and transverse directions of the gage are [110] and [1$\bar{1}$0] respectively. The relative resistance change, $\Delta R/R_0$, is then:

$$\frac{\Delta R}{R_0} = \frac{\sigma_a + \sigma_b}{4} \cdot \pi_{11} \tag{1}$$

where $\sigma_a$ and $\sigma_b$ are the principal stresses in the plane of the gage and $\pi_{11}$ is the longitudinal piezoresistive coefficient for the <001> direction of the crystal. A semiconductor that approximates the ideal (100) valley model is n-silicon, for which $\pi_{11}$ is about $-100 \times 10^{-12}$ cm.$^2$ per dyne at a resistivity of about 10 ohm-cm.

Figure 2:
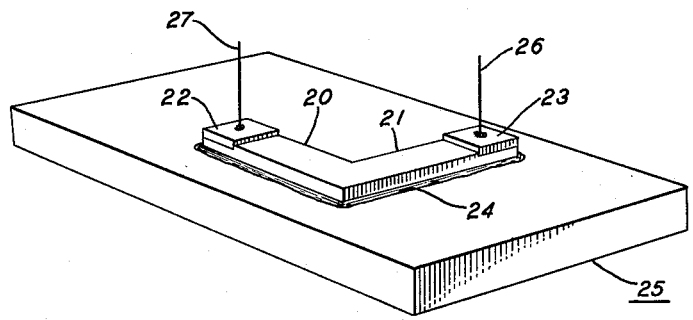

This embodiment and those following will perhaps be better understood with the aid of the drawings in which:

FIG. 1 is a front elevation of a single arm gage according to this invention; and FIG. 2 is a perspective view of a preferred form of the invention utilizing two active arms in the form of an L.

FIG. 1 shows the piezoresistive semiconductor gage arm 1 bonded with glue 2 to the medium 3 in which stresses are to be measured. Contacts 4 and 5 are alloyed to each end of the semiconductor and leads 6 and 7 are connected to a conventional bridge circuit (not shown) for measuring piezoresistive changes. The longitudinal direction is that extending between the two leads while the transverse direction extends normal to the plane of the sheet of the figure.

Another approach to obtain gages independent of the direction of the principal stresses in the medium to be measured is to measure the sum of the piezoresistive effect in two arms having equal resistances and disposed normal to each other. This approach widens the number of suitable crystal orientations and removes the requirement of the semiconductor to have the piezoresistive symmetry corresponding to a particular valley model. It should also be pointed out that these gages are insensitive to shear strains and are thus adapted for measurements of pure directional strains in a body which is additionally under shear strain.

According to this embodiment the sum of the piezoresistive changes in two separate semiconductor strips of a given orientation having equal zero-strain resistances is measured. Whereas the resulting measurement is independent of the direction of principal strain in the medium it is necessary to closely maintain the normal relation between the strips. These strips may differ in composition, size, length, etc. as long as they possess equal zero-strain resistances and a critical relationship between their piezoresistive coefficients, as hereinafter defined, is preserved. For the purpose here, equal zero-strain resistance requires the resistance of one arm to equal within 10% the resistance of the other arm.

A particularly convenient structure providing the advantages of this embodiment is an L shape of a single crystal semiconductor. Using this structure, in preference to two strips, only two contacts are required since the desired piezoresistive effect can be measured between the extremities of the L.

The requirements of the crystal for each arm (designated 1' and 2' for convenience) of a gage insensitive to the directions of the principal stresses are that (a) the longitudinal piezoresistance coefficients, $\pi'_{11}$ and $\pi'_{22}$, of arms 1' and 2', respectively, be equal within 10%, (b) the transverse piezoresistance coefficients, $\pi'_{12}$ and $\pi'_{21}$, of arms 1' and 2' respectively, be equal within 10%, and (c) the longitudinal shear coefficients, $\pi'_{16}$ and $\pi'_{26}$, of arms 1' and 2' respectively, bear the relation of $\pi'_{16} = -\pi'_{26}$ within 10%, where $\pi'_{11}$ etc., are given in terms of the fundamental piezoresistance coefficients of the material, $\pi_{11}$, $\pi_{12}$, and $\pi_{44}$ by:

$$\pi'_{11} = \pi_{11} - 2A(l_1^2 m_1^2 + l_1^2 n_1^2 + m_1^2 n_1^2) \tag{2}$$

$$\pi'_{22} = \pi_{11} - 2A(l_2^2 m_2^2 + l_2^2 n_2^2 + m_2^2 n_2^2) \tag{3}$$

$$\pi'_{12} = \pi'_{21} = \pi_{12} + A(l_1^2 l_2^2 + m_1^2 m_2^2 + n_1^2 n_2^2) \tag{4}$$

$$\pi'_{16} = 2A(l_1^3 l_2 + m_1^3 m_2 + n_1^3 n_2) \tag{5}$$

$$\pi'_{26} = 2A(l_2^3 l_1 + m_2^3 m_1 + n_2^3 n_1) \tag{6}$$

where $$A = (\pi_{11} - \pi_{12} - \pi_{44}) \tag{7}$$

and $l_1$, $m_1$, $n_1$ and $l_2$, $m_2$, $n_2$ are the direction cosines of directions 1' and 2', respectively, with the 1, 2, and 3 axes of the crystal, respectively.

Examples of crystal orientations appropriate for the plane of L-form gages meeting these requirements are: the (001) plane, and the (111) plane. Examples of particular orientations of the L-gage in the (001) plane are (A) and (B) below; an example of a particular orientation in the (111) plane is (C) below:

(A) arm 1: [100] direction; arm 2: [010] direction
(B) arm 1: [1$\bar{1}$0] direction; arm 2: [110] direction
(C) arm 1: [1$\bar{1}$0] direction; arm 2: [11$\bar{2}$] direction The relative resistance change, $\Delta R/R_0$, will be:

$$\frac{\Delta R}{R_0} = \frac{(\sigma_a + \sigma_b)}{2}(\pi'_{11} + \pi'_{12}) \quad (8)$$

An L-shaped gage is shown in FIG. 2. Semiconductor arms 20 and 21, preferably cut from a single crystal, are disposed normal to each other with contacts 22 and 23 alloyed to each extremity. The gage is affixed by glue 24 to member 25 in which stresses are to be measured. Leads 26 and 27 are connected in a conventional bridge circuit (not shown) adapted to measure the piezoresistive change in the gage arms responsive to stresses in the member 25. The longitudinal piezoresistive direction for each arm is in the direction of the length while the transverse piezoresistive direction is in the direction of the width of each arm.

For L-shaped gages in the (001) plane, Equation 8 can be written:

$$\frac{\Delta R}{R_0} = \frac{\sigma_a + \sigma_b}{2}(\pi_{11} + \pi_{12}) \quad (9)$$

For L-shaped gages in the (111) plane, Equation 8 can be written:

$$\frac{\Delta R}{R_0} = \frac{\sigma_a + \sigma_b}{6}(\pi_{11} + 2\pi_{12} + \pi_{44}) \quad (10)$$

Materials suitable for $\pi$-shaped gages of orientations (A) and (B) above are n-silicon, and oxygen-deficient titanium dioxide (rutile) of resistivity about 0.2 ohm-cm. Materials suitable for orientations (C) are: p-silicon, n-germanium, p-germanium, all of resistivity in the range from about 10 to 0.001 ohm-cm., p-lead telluride (PbTe) of resistivity about 0.01 ohm-cm., p-indium antimonide (InSb) of resistivity at 77° K. of about 0.5 ohm-cm., and n-InSb of resistivity at 77° K. of about 0.013 ohm-cm., all of which have large values of $(\pi_{11} + 2\pi_{12} + \pi_{44})$. Where two separate arms are employed, these materials having the orientations (A), (B), and (C) are equally as effective.

A further embodiment of this invention utilizes piezoresistive semiconductors which, when employed according to these teachings, provide a significant piezoresistive response to stresses in one principal direction but are essentially unaffected by stresses in a direction normal to the principal direction. The most ideal gage providing this result is one which possesses an essentially zero transverse piezoresistive coefficient. However, to obtain the advantages of this gage modification, it is only essential to have a large longitudinal coefficient with respect to the transverse coefficient. For proper results the transverse coefficient is preferably less than 10% of the value of the longitudinal coefficient.

Such a gage is very useful where, for example, it is desired to measure the stress in a body along a certain direction, such as, vertically on a supporting wall, independently of any transverse stresses that may be present. Ordinary strain gages cannot provide this function because the gage reading is affected by the Poisson strain in the longitudinal direction caused by a transverse stress. By selecting certain crystal orientations, and designing the semiconducting gage so that transverse stresses are actually transmitted to the gage, then, for these special orientations the gage reading will not be affected by these transverse stresses. Paradoxically, if the semiconducting gage is in the form of a narrow rod, which cannot pick up transverse stresses, it will be sensitive to these through the Poisson strain. The feature common to semiconducting gages insensitive to transverse stress in the medium is that the transverse direction in the plane of the gage (normal to the current direction) be a direction symmetrical to the valley direction, e.g. <100> for a (111) valley semiconductor, <111> for a (100) valley semiconductor. A longitudinal direction suitable for both types of semiconductor is <110>. The relative resistance change will be:

For the (111) valley material:

$$\frac{\Delta R}{R_0} = \frac{(\pi_{44})}{2}\sigma \quad (11)$$

where $\sigma$ is the resolved longitudinal normal stress. For the (100) valley material:

$$\frac{\Delta R}{R_0} = \frac{(\pi_{11})}{4}\sigma \quad (12)$$

*Example I*

A straight-form gage that reads the sum of the principal biaxial stresses independent of direction is made from a single crystal of n-silicon bonded to a massive steel member. The resistivity is about 0.1 ohm-cm. and the approximate dimensions are 1×0.2×0.005 cm., making the resistance $R_0$ about 100 ohms. The [110] and [1$\bar{1}$0] directions are parallel to the length and width respectively.

For the sum of the principal stresses in the gage $(\sigma_a + \sigma_b)$ equal to $1 \times 10^8$ dynes per cm.$^2$, the relative resistance change of $\Delta R/R_0$ of the gage is, from Equation 1, for $\pi_{11}/4$ about $25 \times 10^{-12}$ cm.$^2$ per dyne, about 0.25%, which is easily read on a conventional strain-gage bridge. This same reading is obtained for any direction assumed by the gage. The sum of the principal stresses in the body is equal to the sum in the gage multiplied by the ratio of the Young's modulus of the body to that of the gage. For a silicon gage on a steel body this ratio is 1.5.

*Example II*

An L-form gage having arms 0.5 cm. long (measured on the inside of the L), 0.2 cm. wide, and 0.005 cm. thick is bonded to a massive steel body. The gage is a single crystal of p-silicon, of resistivity 0.1 ohm-cm. The arms lie in the [1$\bar{1}$0] and [11$\bar{2}$] crystal directions. If the sum of the principal stresses in the gage is $1 \times 10^8$ dynes per cm.$^2$, the relative resistance change will be $$(1 \times 10^8)(\pi_{44}/6) = (1 \times 10^8)(23 \times 10^{-12}) = .23 \times 10^{-2}$$

or about 0.23%. The sum of principal stresses in the steel body will be those in the gage multiplied by 1.5, the ratio of Young's moduli in the steel to that in the gage. The same resistance change is obtained regardless of the orientation of the gage with respect to the body.

*Example III*

A gage essentially insensitive to transverse stress is made from a single crystal of n-germanium, about $1.0 \times 0.2 \times 0.005$ cm. in dimensions, bonded to a massive steel plate. The long direction, parallel to the measuring current flow is [1$\bar{1}$0], the transverse direction is [001]. A stress in the gage of $1 \times 10^8$ dynes per cm.$^2$, parallel to the long direction, produces a resistance change given by Equation 11:

$$\Delta R/R_0 = (\pi_{44}/2)(1 \times 10^8) = (69 \times 10^{-12})(1 \times 10^8)$$
$$= 0.69 \times 10^{-2} = 0.69\%$$

If a transverse stress of this same order of magnitude is now applied to the panel, the additional resistance change will be negligibly small.

All of the gage configurations discussed herein are particularly well-adapted to construction by diffusion techniques as set forth fully in application Serial No. 80,672, filed January 4, 1961.

Various other modifications and continuations of the fundamental principles set forth herein will become apparent to those skilled in the art. Such variations, which depend primarily on the application of technical princi-

What is claimed is:

1. A semiconductor piezoresistive stress gage which comprises two active piezoresistive semiconductor strips having equal resistances within 10% disposed normal to one another and means including electrode contacts to said strips for measuring the sum of the piezoresistive change in both strips, said two strips having with respect to one another equal longitudinal piezoresistive coefficients within 10%, equal transverse piezoresistive coefficients within 10%, and equal and opposite-in-sign longitudinal shear coefficients to within 10%.

2. The gage construction of claim 1 wherein said strips constitute a single semiconductor crystal in the form of an L and the means for measuring the sum of the piezoresistive change in both strips includes two contacts at either extremity of the L.

3. The gage of claim 2 wherein the crystallographic orientation of the single crystal semiconductor in the plane of the L form gage is (001).

4. The gage of claim 3 wherein the semiconductor is n-silicon.

5. The gage of claim 2 wherein the crystallographic orientation of the single crystal semiconductor in the plane of the L form gage is (111).

6. The gage of claim 5 wherein the semiconductor is selected from the group consisting of p-germanium, n-germanium and p-silicon.

7. The gage construction of claim 2 wherein the crystal is n-type silicon, the crystallographic direction of one arm is [100] and the crystallographic direction of the other arm is [010].

8. The gage construction of claim 2 wherein the crystal is n-type silicon, the crystallographic direction of one arm is [110] and the crystallographic direction of the other arm is [1$\bar{1}$0].

9. The gage construction of claim 2 wherein the crystal is n-type germanium, the crystallographic direction of one arm is [1$\bar{1}$0] and the crystallographic direction of the other arm is [11$\bar{2}$].

10. A piezoresistive stress gage which comprises a semiconductor wafer, means for subjecting said wafer to mechanical stress and electrical means associated with said wafer for detecting resistance variations responsive to said mechanical stress, said electrical means including electrode contacts to said wafer disposed in a manner so as to obtain resistance variations in a direction in the plane of the wafer providing a piezoresistive transverse coefficient which is less than 10% of the longitudinal coefficient.

11. The device of claim 10 wherein the direction of piezoresistive measurement is a direction having an essentially zero transverse piezoresistive coefficient.

12. The device of claim 11 wherein the crystal is n-type germanium and the direction of piezoresistive measurement is [1$\bar{1}$0] and the transverse direction in the plane of the gage is [001].

13. A piezoresistive stress gage which comprises a semiconductor wafer, means for subjecting said wafer to mechanical stress and electrical means associated with said wafer for detecting resistance variations responsive to said mechanical stress, said electrical means including electrode contacts to said wafer disposed in a manner so as to obtain resistance variations in a direction in the plane of the wafer providing a transverse piezoresistive coefficient which is equal to the longitudinal piezoresistive coefficient within 10% and a negligible longitudinal shear coefficient.

14. The device of claim 13 wherein the direction of piezoresistive measurement is a direction in which the transverse piezoresistive coefficient is essentially equal to the longitudinal piezoresistive coefficient.

15. The device of claim 14 wherein the crystal is n-type silicon and the direction of piezoresistive measurement is [1$\bar{1}$0] and the transverse direction in the plane of the gage is [110].

References Cited in the file of this patent

UNITED STATES PATENTS

| | | |
|---|---|---|
| 2,249,933 | Bechmann | July 22, 1941 |
| 2,554,324 | Chambers | May 22, 1951 |
| 2,558,563 | Janssen | June 26, 1951 |
| 2,592,223 | Williams | Apr. 8, 1952 |
| 2,789,068 | Maserjian | Apr. 16, 1957 |

OTHER REFERENCES

Forst's "Applications of Semiconductors Transducers in Strain Gages," pages 142–8, March 1959, S.E.S.A.